US011165305B2

(12) United States Patent
Lee

(10) Patent No.: US 11,165,305 B2
(45) Date of Patent: Nov. 2, 2021

(54) MOTOR CONNECTOR AND MOTOR HAVING SAME

(71) Applicant: LG INNOTEK CO., LTD., Seoul (KR)

(72) Inventor: Hae Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 406 days.

(21) Appl. No.: 16/309,228

(22) PCT Filed: May 18, 2017

(86) PCT No.: PCT/KR2017/005156
§ 371 (c)(1),
(2) Date: Dec. 12, 2018

(87) PCT Pub. No.: WO2017/217665
PCT Pub. Date: Dec. 21, 2017

(65) Prior Publication Data
US 2019/0334404 A1 Oct. 31, 2019

(30) Foreign Application Priority Data

Jun. 15, 2016 (KR) .......................... 10-2016-0074250

(51) Int. Cl.
H02K 5/10 (2006.01)
H02K 5/22 (2006.01)
(Continued)

(52) U.S. Cl.
CPC ............... *H02K 5/10* (2013.01); *H02K 5/225* (2013.01); *H02K 7/085* (2013.01); *H02K 11/20* (2016.01);
(Continued)

(58) Field of Classification Search
CPC H02K 5/225; H02K 5/22; H02K 5/10; H02K 3/50; H02K 3/38; H02K 7/08;
(Continued)

(56) References Cited

U.S. PATENT DOCUMENTS 5,616,975 A * 4/1997 May ...................... H02K 5/225
310/89
2005/0082918 A1* 4/2005 Hirt ........................ F16H 61/28
310/43
(Continued)

FOREIGN PATENT DOCUMENTS

DE 10-2015-211459 1/2016
JP 09266651 A * 10/1997
(Continued)

OTHER PUBLICATIONS

Watanabe et al, Motor, Oct. 7, 1997, Hitachi Ltd, JP 09266651 (English Machine Translation) (Year: 1997).*
(Continued)

*Primary Examiner* — Quyen P Leung
*Assistant Examiner* — Alexander A Singh
(74) *Attorney, Agent, or Firm* — Ked & Associates, LLP

(57) ABSTRACT

A motor connector comprises: a wiring unit, which includes an electric wire having a conductive wire having a conductive wire exposed through an insulating sheath, and a terminal coupled to the conductive wire and having a terminal formed at an end thereof; a base including a first molding part, in which the terminal is arranged, and a second molding part extending from the first molding part to the outside and having a space for accommodating the conductive wire and a part of the insulating sheath adjacent to the conductive wire; a fixing member coupled to the second molding part, and covering and fixing the sheath; and a grommet arranged in the space and coupled to an outer surface of the insulating sheath so as to press the electric wire.

13 Claims, 8 Drawing Sheets

(51) Int. Cl.
  *H02K 11/20* (2016.01)
  *H02K 7/08* (2006.01)
  *B29C 45/14* (2006.01)
  *H01B 7/18* (2006.01)
  *H01R 13/52* (2006.01)

(52) U.S. Cl.
  CPC ................ *B29C 45/14* (2013.01); *H01B 7/18* (2013.01); *H01R 13/5205* (2013.01)

(58) Field of Classification Search
  CPC .... H02K 7/085; H01R 13/5205; H01R 13/52; H01R 13/5202; H01R 13/521; H01R 13/5219; H01R 2201/10
  USPC .......................................................... 310/71
  See application file for complete search history.

(56) References Cited

U.S. PATENT DOCUMENTS

| | | | | |
|---|---|---|---|---|
| 2008/0150377 | A1* | 6/2008 | Yamaguchi | H02K 5/225 310/71 |
| 2011/0006625 | A1* | 1/2011 | Fujii | H02K 5/225 310/71 |
| 2013/0330217 | A1* | 12/2013 | Enami | F04B 39/14 417/410.1 |
| 2015/0207258 | A1* | 7/2015 | Moriuchi | H01R 13/5205 439/586 |
| 2016/0165736 | A1* | 6/2016 | Tsuboi | H02K 11/33 310/71 |
| 2016/0380502 | A1* | 12/2016 | Koiwai | H02K 3/50 310/71 |

FOREIGN PATENT DOCUMENTS

| | | |
|---|---|---|
| JP | H09-266651 | 10/1997 |
| JP | H 10-285878 | 10/1998 |
| JP | 2007-166682 A | 6/2007 |
| JP | 2008-283816 A | 11/2008 |
| JP | 2010-178537 A | 8/2010 |
| JP | 2011-045177 | 3/2011 |
| JP | 2013-207141 | 10/2013 |
| JP | 2014-091220 | 5/2014 |
| JP | 2015-149852 | 8/2015 |
| JP | 2015149852 A * | 8/2015 |
| JP | 2016-021811 A | 2/2016 |
| KR | 10-2011-0048968 | 5/2011 |
| KR | 10-2011-0078262 | 7/2011 |
| KR | 101448511 B1 * | 10/2014 |

OTHER PUBLICATIONS

Kurokawa et al, Rotating Electric Machine, Mar. 28, 2018, Kayaba IND Co. Ltd, JP 2015149852 (English Machine Translation) (Year: 2015).*
Jeon Byeong Seon, Sealed Complex Terminal Connector, Oct. 13, 2014, Se Yang Co. Ltd, KR 101448511 (English Machine Translation) (Year: 2014).*
Chinese Office Action dated Dec. 1, 2020 issued in Application No. 201780037623.8.
European Search Report dated Dec. 16, 2019 issued in Application No. 17813490.4.
International Search Report (with English Translation) and Written Opinion dated Aug. 8, 2017 issued in Application No. PCT/KR2017/005156.
Japanese Office Action dated Jun. 1, 2021 issued in Application 2018-564895.
European Patent Office communication dated Feb. 8, 2021.

* cited by examiner

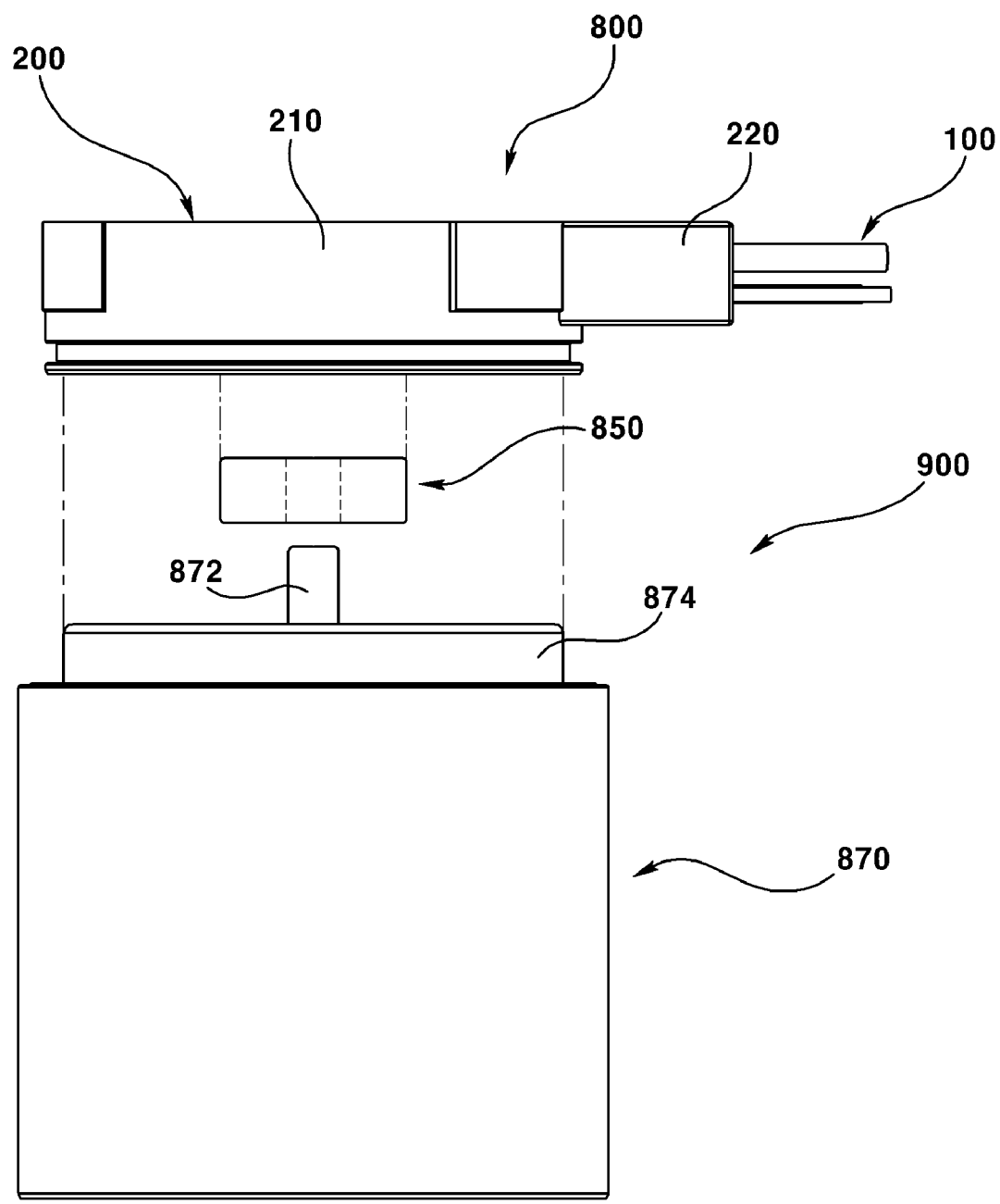

MOTOR CONNECTOR AND MOTOR HAVING SAME

CROSS-REFERENCE TO RELATED PATENT APPLICATIONS

This application is a U.S. National Stage Application under 35 U.S.C. § 371 of PCT Application No. PCT/KR2017/005156, filed May 18, 2017, which claims priority to Korean Patent Application No. 10-2016-0074250, filed Jun. 15, 2016, whose entire disclosures are hereby incorporated by reference.

TECHNICAL FIELD

The teachings in accordance with exemplary and non-limiting embodiments of this invention relate generally to a motor connector and a motor having the same, and more particularly to a motor connector configured to be used for a dual clutch transmission improved in hermeticity (sealing, airtightness) by preventing introduction of moisture or foreign object from outside, and a motor having the motor connector.

BACKGROUND ART

In general, motors are used in various sectors of industrial fields. A type of motor, called a BLDC (Brushless DC) motor, is used for a DCT (Dual Clutch Transmission) applied to transmissions of a vehicle, electric propulsion engines and electric vehicles.

A motor used for DCT may include a connector in order to provide electricity or a control signal from outside to the motor.

A motor operated along with a vehicle under a harsh environment such as moisture and water on a road, and snows piled on a road and a connector mounted on a motor require high hermeticity characteristics and high airtightness against the moisture and humidity that may cause a motor with an erroneous operation by infiltration of moisture and humidity.

In general, a connector coupled to a motor used for a DCT may be indirectly measured in hermeticity and airtightness through an air leak test.

The air leak test for hermeticity characteristic and airtightness of a motor and connector may be implemented by measuring a degree of leaked air by providing air of a predetermined pressure into the motor and the connector coupled to the motor.

The air leak to be generated from a connector and a motor is largely generated by a difference of expansion coefficient between a terminal transmitting a power and sensing signal and a mold forming a body of connector, a difference of expansion coefficient between a cable sheath and a mold forming a body of a connector, and a difference of expansion coefficient between a core wire wrapped by the cable sheath and a mold forming a body of a connector.

Furthermore, the air leak to be generated form the connector and motor may be generated by a gap formed between a conductive wire of electric wire and insulation sheath.

When moisture or humidity is introduced through the connector by various reasons, the moisture or humidity introduced into the connector may cause an erroneous operation of motor.

DETAILED DESCRIPTION OF THE INVENTION

Technical Subject

The present invention provides a motor connector configured to prevent an erroneous operation of motor by preventing introduction of humidity and moisture caused by a difference of expansion coefficient between a terminal transmitting a power and sensing signal and a mold forming a body of connector, a difference of expansion coefficient between a cable sheath and a mold forming a body of a connector, and a difference of expansion coefficient between a core wire wrapped by the cable sheath and a mold forming a body of a connector, and a motor having the motor connector.

Furthermore, the present invention provides a motor connector configured to prevent an erroneous operation of motor by preventing introduction of humidity and moisture by preventing formation of a gap between a conductive wire of a cable and an insulation sheath and a gap between an insulation sheath and a molding member.

Technical Solution

In one general aspect of the present invention, there is provided a motor connector, comprising:

a wiring unit, which includes an electric wire (cable) having an insulating sheath and a conductive wire, and a terminal coupled to the conductive wire and having a terminal formed at an end thereof;

a base including a first molding part, in which the terminal is arranged, and a second molding part extending from the first molding part and having a space for accommodating the conductive wire and a part of the insulating sheath;

a fixing member coupled to the second molding part, and fixing the sheath; and a grommet arranged in the space between the fixing member and the second molding part, and coupled to an outer surface of the electric wire so as to press the electric wire.

Preferably, but not necessarily, the grommet may be formed with a cylindrical shape.

Preferably, but not necessarily, an internal diameter of grommet may be formed to be smaller than an outer diameter of insulating sheath based on a center of electric wire.

Preferably, but not necessarily, an internal diameter of grommet may be formed to be smaller by 60%-70% than an outer diameter of insulating sheath based on a center of electric wire.

Preferably, but not necessarily, the motor connector further comprise a molding member filled in the space to mold the first molding part and the second molding part.

Preferably, but not necessarily, the grommet may include a shrinkage member pressed by the molding member to have a shrinkage force.

Preferably, but not necessarily, the molding member may include any one of a rubber, an epoxy and a silicon having flexibility and adhesive property.

Preferably, but not necessarily, the first molding part may include a trench-type groove formed along an upper edge of the first molding part based on a center of the first molding part, and the groove may be formed by being filled with the molding member formed in the second molding part.

Preferably, but not necessarily, the grommet may include any one of silicon and rubber.

Preferably, but not necessarily, the electric wire may include a plurality of electric source wires applied with an electric source, and a plurality of sensing wires inputted and outputted by a sensing signal.

Preferably, but not necessarily, the second molding part may include a plurality of lateral wall parts forming the space by being upwardly extended from a floor part and from an edge of the floor part, wherein the floor part may include a staircase formed by being upwardly protruded from an upper surface of floor part, and the floor part may include a terminal reception groove having a slit shape concavely formed at an upper surface of the staircase, and any one of the plurality of lateral wall parts may be formed with an electric wire reception groove disposed with the electric wire.

Preferably, but not necessarily, the lateral wall part of second molding part formed with the electric wire reception groove may be formed with a first coupling part coupled with the fixing member, and the fixing member may be formed with a second coupling part coupled with the first coupling part.

In another general aspect of the present invention, there is provided a motor, comprising:

a motor connection including a wiring unit, which includes an electric wire (cable) having an insulating sheath and a conductive wire, and a terminal coupled to the conductive wire and having a terminal formed at an end thereof; a base including a first molding part, in which the terminal is arranged, and a second molding part extending from the first molding part and having a space for accommodating the conductive wire and a part of the insulating sheath; a fixing member coupled to the second molding part, and fixing the sheath; and a grommet arranged in the space between the fixing member and the second molding part, and coupled to an outer surface of the electric wire so as to press the electric wire;

a bearing disposed at a center of the base; and a motor body including an axis coupled with the bearing.

Advantageous Effects

The motor connector and motor having the same can prevent an erroneous operation of motor by improving hermeticity (sealing) and airtightness despite a difference of expansion coefficient between a terminal transmitting a power and sensing signal and a mold forming a body of connector, a difference of expansion coefficient between a cable (electric wire) sheath and a mold forming a body of a connector, and a difference of expansion coefficient between a core wire wrapped by the cable sheath and a mold forming a body of a connector.

Furthermore, the present invention provides a motor connector configured to prevent an erroneous operation of motor by preventing introduction of humidity and moisture by preventing formation of a gap between a conductive wire of a cable and an insulation sheath, and a gap between an insulation sheath and a molding member.

BRIEF DESCRIPTION OF DRAWINGS

FIG. 11 is an exploded view of a motor having a motor connector according to an exemplary embodiment of present invention.

BEST MODE

The present invention to be explained hereunder may have various variations, and exemplary embodiments, and particular exemplary embodiments will be exemplified through drawings and explained in detail in the detailed description of the present invention.

The present subject matter may, however, be embodied in many different forms and modifications, and should not be construed as limited to the specific embodiments set forth herein. It will be appreciated that the described aspect is intended to embrace all such alterations, modifications, and variations that fall within the scope and novel idea of the present invention. Accordingly, in describing the present invention, detailed descriptions of well-known art may be omitted to avoid obscuring appreciation of the invention.

As used herein, the singular forms "a," "an" and "the" are intended to include the plural forms as well, unless the context clearly indicates otherwise. It will be further understood that the terms "comprises", "includes" and/or "comprising," "including" when used in this specification, specify the presence of stated features, integers, Steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another.

Figure 1:
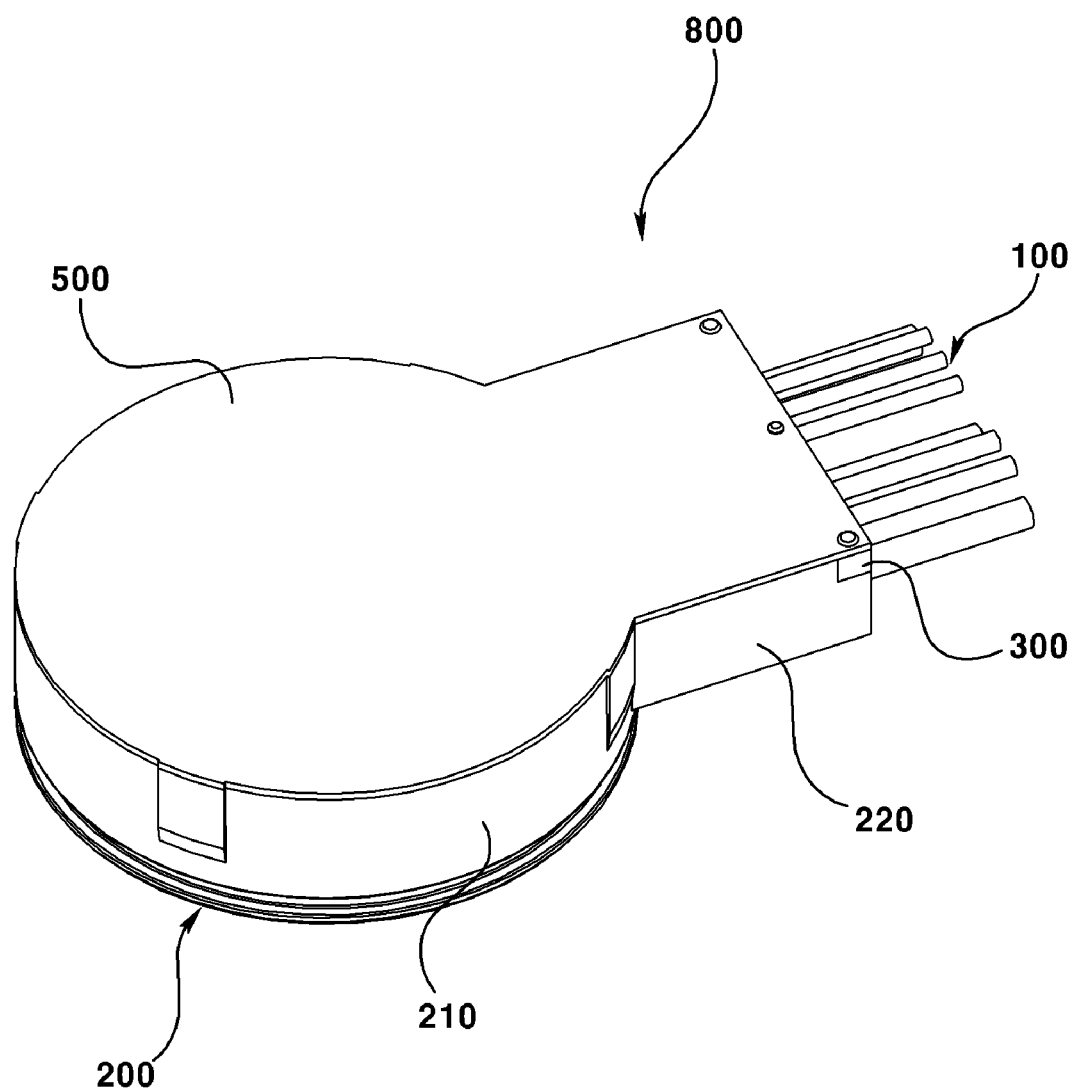
FIG. 1 is a schematic perspective view of exterior look of motor connector according to an exemplary embodiment of present invention.
Figure 2:
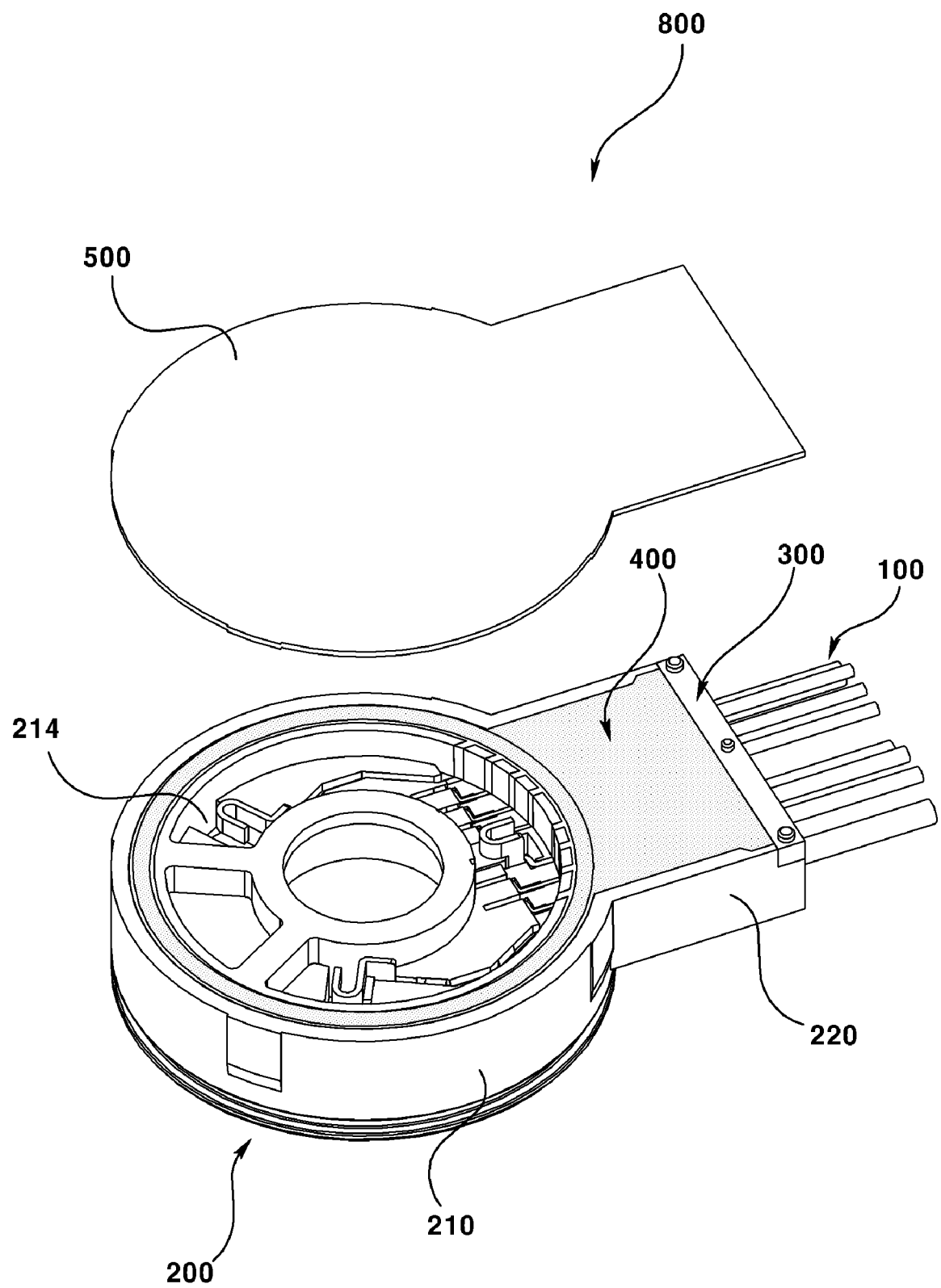
FIG. 2 is an exploded perspective view illustrating a cover of motor connector of FIG. 1.

FIG. 1 is a schematic perspective view of exterior look of motor connector according to an exemplary embodiment of present invention, and FIG. 2 is an exploded perspective view illustrating a cover of motor connector of FIG. 1.

Referring to FIGS. 1 and 2, a motor connector (800) may include a wiring unit (100), a base (200), a fixing member (300) and a molding member (400). In addition, the motor connector (800) may further include a cover (500) coupled with the base (200).

Figure 3:
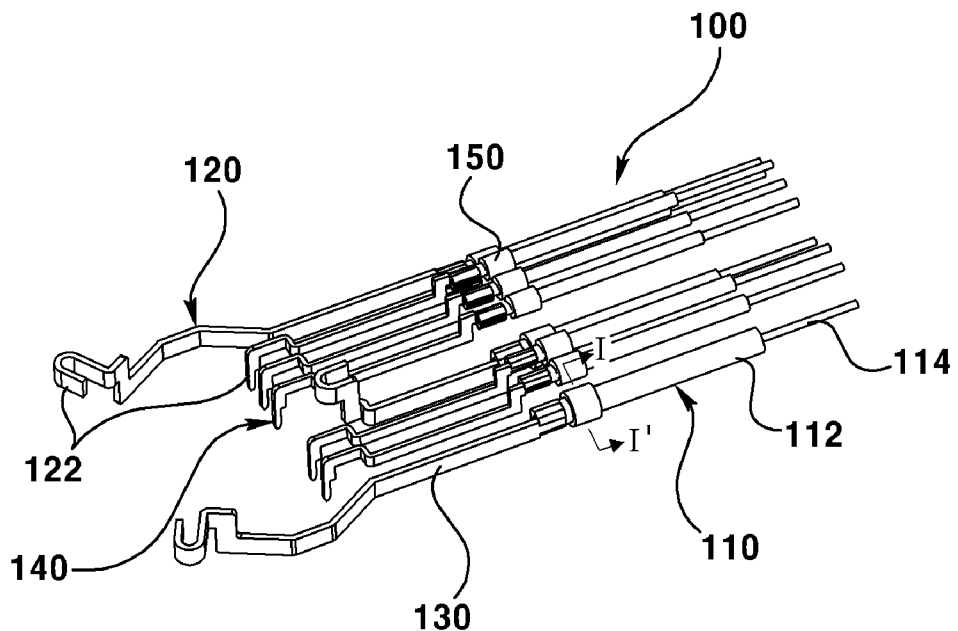
FIG. 3 is a schematic perspective view illustrating a wiring unit of FIG. 2.

FIG. 3 is a schematic perspective view illustrating a wiring unit of FIG. 2.

Referring to FIG. 3, the wiring unit (100) may include an electric wire (110), a terminal (120) and a grommet (150).

The electric wire (110) may include an insulating sheath (112) and a conductive wire (114, or core wire) wrapped by the insulating sheath (112), and a distal end of the insulating sheath (112) may be removed from the conductive wire (114) and as a result, the distal end of the insulating sheath (114) may be exposed to outside.

The terminal (120) may be electrically connected to a distal end of the conductive wire (114) exposed by the insulating sheath (112). For example, the terminal (120) may be connected to the conductive wire (114) exposed by the insulating sheath (112) by a clamping method. Alternatively, the terminal (120) and the conductive wire (114) may be electrically connected by various methods including welding and coupling.

The terminal (120) may be manufactured with a conductive material, for example, and a distal end of terminal (120) may be formed with a ring-shaped or bent shaped terminal part (122). The distal end of terminal (120) may be electrically connected to a terminal part of motor.

In an exemplary embodiment of the present invention, the wiring unit (100) including the electric wire (110) and the terminal (120) may be classified to an electric power source wire (130) and a sensing wire (140) depending on types of applied signals.

The electric power source wire (130) may provide an electric power to the motor, and the sensing wire (140) may input or output a control signal or a sensing signal.

In an exemplary embodiment of present invention, the electric power source wire (130) may be formed with three pieces to allow being applied with a 3-phase electric power, for example, and the sensing wire (140) may be formed with 5 pieces, for example.

In an exemplary embodiment of present invention, the electric wire (110) of wiring unit (100) may include a conductive wire (114) and an insulating sheath (112), where, when there is formed a fine gap between the conductive wire (114) and the insulating sheath (112), moisture or humidity may be introduced through the gap formed between the conductive wire (114) and the insulating sheath (112).

Moreover, the insulating sheath (112) of electric wire (110) is used with a PE (Polyethylene) resin excellent in insulation and durability, and the PE resin is poor in adhesive property unlike the other resins, and when there is no adhesive property on the molding member (400), there may be generated a gap between the molding member (400) and the insulating sheath (112) due to there being no adhesiveness with the molding member (400) to thereby allow introducing the moisture or humidity.

In the exemplary embodiment of present invention, a grommet (150, described later) may be coupled to the insulating sheath (112) of electric wire (110) in order to prevent moisture or humidity from being introduced through a gap to be possibly formed between the insulating sheath (112) and the conductive wire (114) and a gap to be possibly formed between the molding member (400) and insulating sheath (112).

Figure 4:
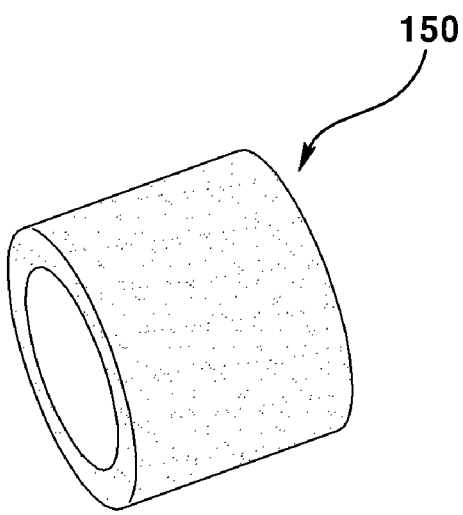
FIG. 4 is a perspective view illustrating a grommet according to an exemplary embodiment of present invention.
Figure 5:
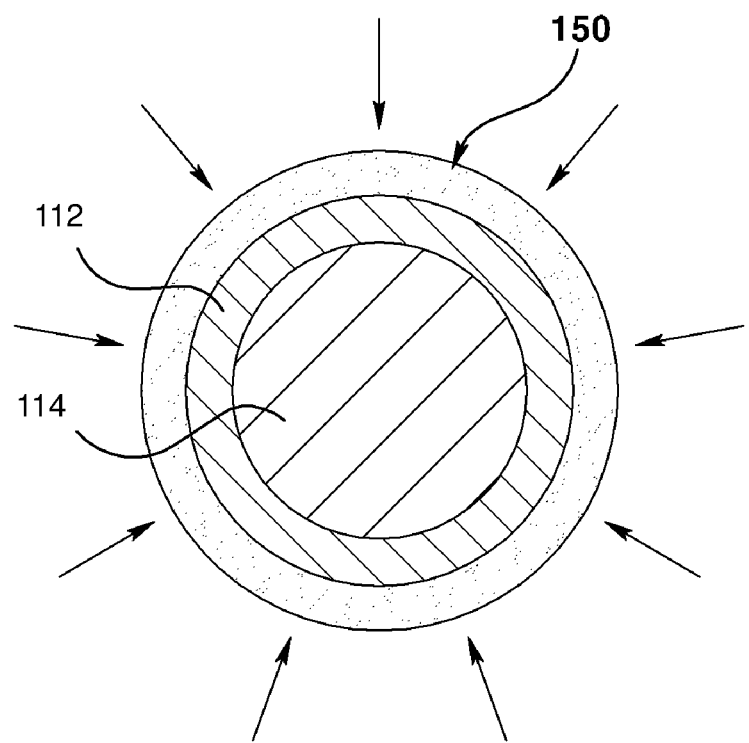
FIG. 5 is a cross-sectional view taken along line I-I' of FIG. 3.
Figure 6:
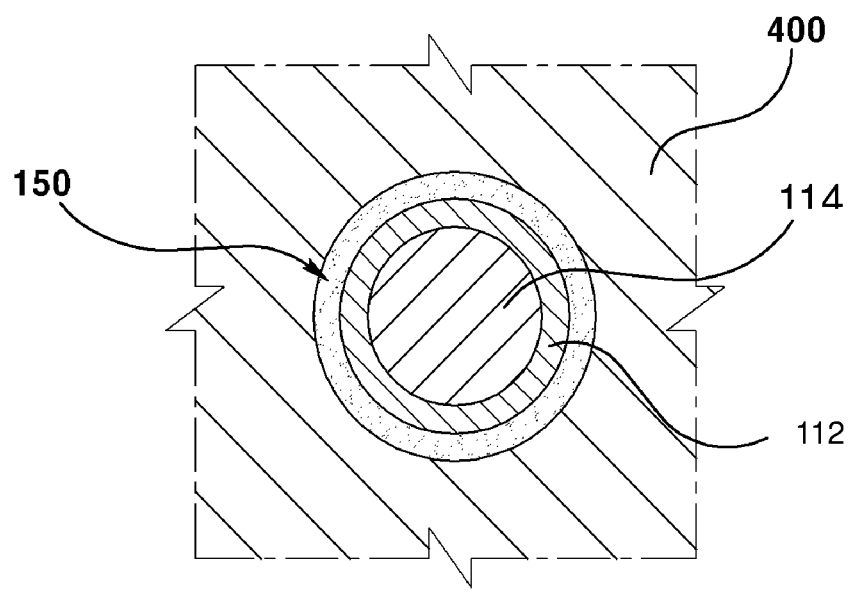
FIG. 6 is a cross-sectional view illustrating an electric wire (cable), a grommet and a molding member.

FIG. 4 is a perspective view illustrating a grommet according to an exemplary embodiment of present invention, FIG. 5 is a cross-sectional view taken along line I-I' of FIG. 3, and FIG. 6 is a cross-sectional view illustrating an electric wire (cable), a grommet and a molding member.

Referring to FIGS. 4, 5, and 6, the grommet (150) may be formed in a shape by being inserted into an outside of the insulating sheath (112). For example, when a cross-section of the electric wire (110) including the insulating sheath (112) and the conductive wire (114) is formed in a round shape, the grommet (150) may be also formed in a cylindrical shape, for example.

Although the exemplary embodiment of present invention has illustrated and explained that the grommet (150) is formed in a cylindrical shape, alternatively, the grommet (150) may be formed in various 3D shape formed with a hollow hole thereinside.

The grommet (150) may be manufactured with a silicon material or rubber material having a low hardness and having an excellent shrinkage force, and the grommet (150) may be used with various materials that may be shrunken or deformed by pressure applied from outside. The grommet (150) may prevent humidity and moisture from penetrating between the insulating sheath (112) and conductive wire (114) by removing a gap existing between the insulating sheath (112) and conductive wire (112) by locally applying a pressure to the insulating sheath (112) of electric wire (110).

In order to allow the grommet (150) to locally apply a pressure to the insulating sheath (112) of electric wire (110), an internal diameter of grommet before the grommet (150) is coupled with the insulating sheath (112) of electric wire (110) may be formed to be smaller than an outer diameter (or diameter of outside) of insulating sheath. The internal diameter of grommet (150) may be formed to be smaller by 60%~70% than an outer diameter of insulating sheath (112) of electric wire (110). For example, when an outer diameter of insulating sheath (150) is Φ2 mm, an internal diameter of grommet (150) may be Φ1.2 mm~Φ1.5 mm.

FIG. 6 is a cross-sectional view illustrating an electric wire (cable), a grommet and a molding member.

Referring to FIG. 6, in the exemplary embodiment of present invention, when the molding member (400, described later) is injected on the outside of grommet (150), the grommet (150) may be compressed by the injection pressure of molding member (400) to apply a pressure to the insulating sheath (112) of electric wire (110) with bad adhesive force whereby a gap formed between the insulating sheath (112) and the grommet (150), and a gap formed between the grommet (150) and the molding member (400) can be removed to prevent humidity and moisture from being introduced.

Figure 7:
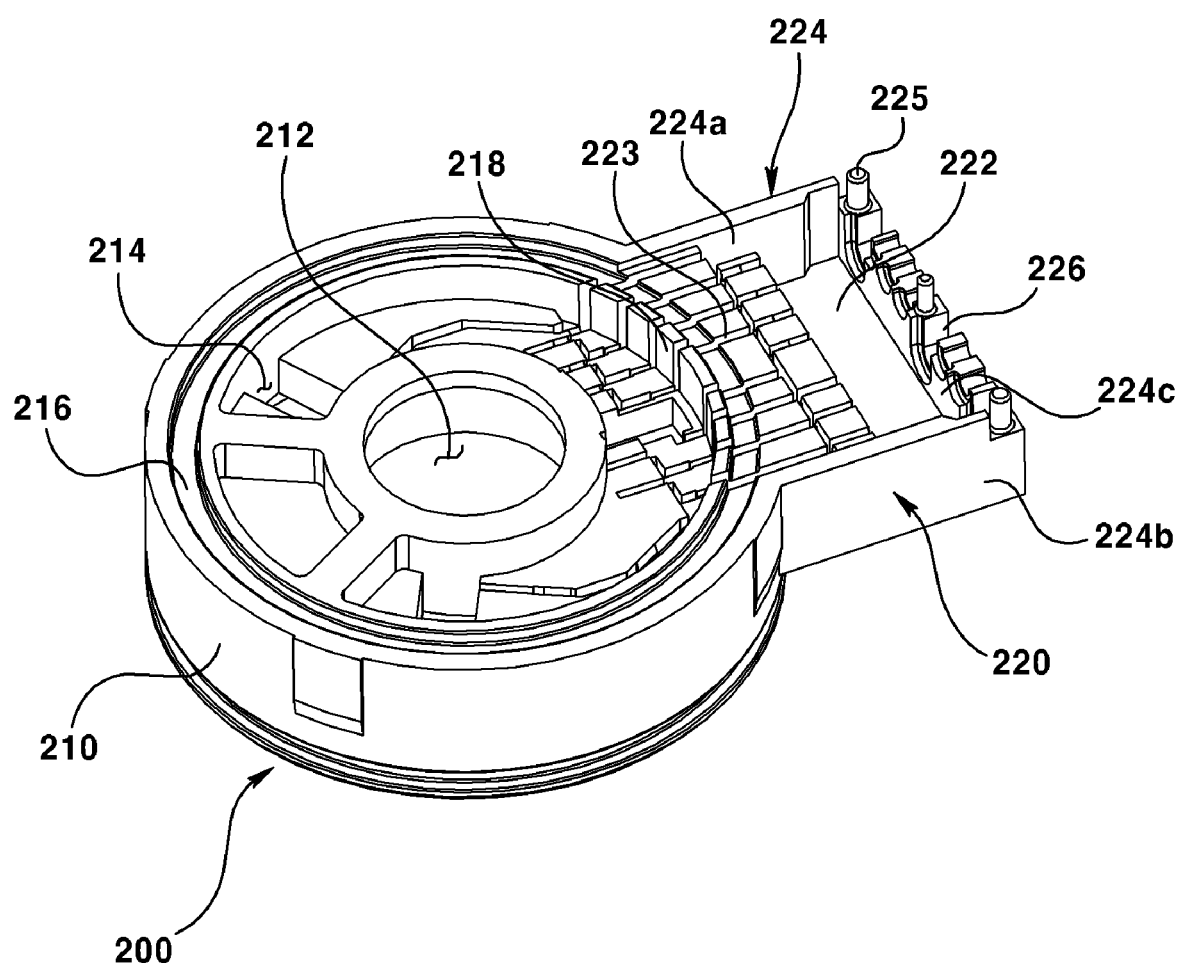
FIG. 7 is a perspective view illustrating a base of FIG. 2.

FIG. 7 is a perspective view illustrating a base of FIG. 2.

Referring to FIG. 7, the base (200) may include a first molding part (210) and a second molding part (220). The first molding part (210) is a portion coupled with an axis of motor, and may be formed at a center with a through hole (212) to mount a bearing coupled with the axis of motor. The first molding part (210) may be manufactured with various shapes, but the first molding part (210) according to an exemplary embodiment of present invention may be formed with a short cylindrical shape.

Three holes (214) passing through the first molding part (210), each spaced apart at an equidistance, may be formed about the through hole (212) of the first molding part (210), for example. The said three holes (214) formed around the through hole (212) of first molding part (210) may be respectively disposed with a terminal part (122) of terminal (120).

Meantime, an upper surface of first molding part (210) may be formed with a trench-shaped groove (216) along an edge of the upper surface.

The second molding part (220) may be formed by being extended outside of first molding part (210).

The second molding part (220) may provide a space fixing and accommodating portions of electric wire (110) and terminal (120) illustrated in FIG. 3, and accommodating a molding member (400, see FIG. 2) that prevents moisture and humidity from being introduced into the first molding part (210) from the second molding part (220) and the grommet (150).

The second molding part (220) may include a floor part (222) and a lateral wall part (224) in order to form the space.

The floor part (222) of second molding part (220) may be formed with a plate shape and outwardly extended from the first molding part (210). In the exemplary embodiment of the present invention, the floor part (222) of second molding part (220) may be formed with a staircase (stepped portion) having a height difference.

An area, where a height is relatively higher on the floor part (222) formed with the staircase, may be formed with a terminal reception groove (223) to a direction facing to a lower surface from an upper surface.

The terminal reception groove (223) may be formed with a slip shape, for example, and inserted into the terminal (120), where the terminal (120) inserted into the terminal reception groove (223) may not horizontally move inside the second molding part (220).

Although the terminal (120) inserted into the terminal reception groove (223) may not horizontally move inside the second molding part (220), the terminal (120) may still move to a vertical direction inside the second molding part (220).

Figure 8:
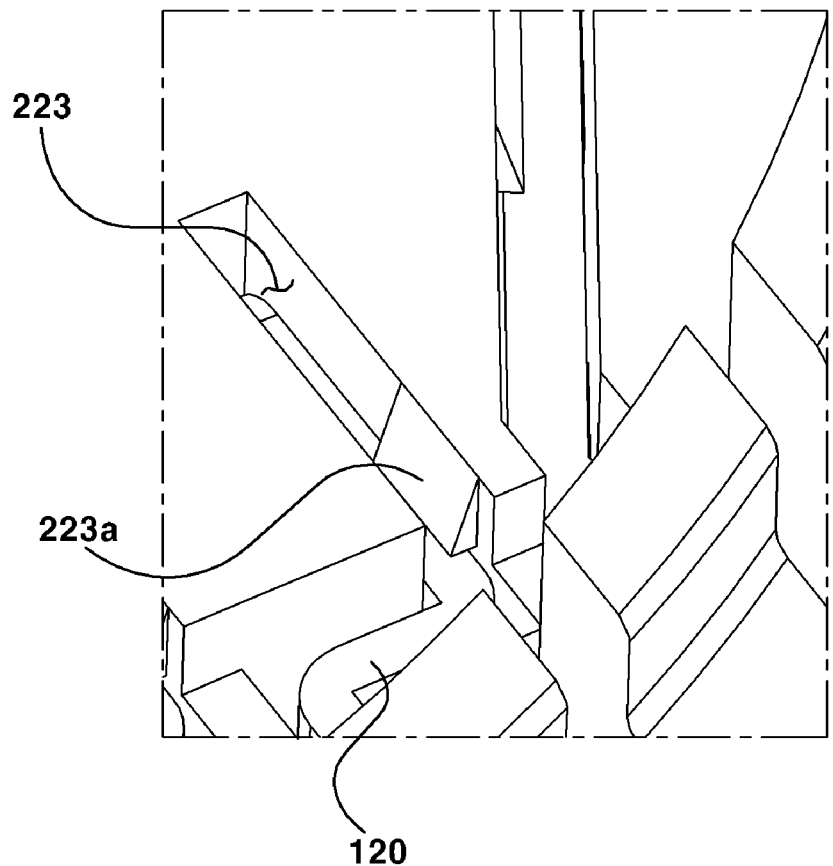
FIG. 8 is a perspective view illustrating a disengagement prevention protrusion formed on a base.

FIG. 8 is a perspective view illustrating a disengagement prevention protrusion formed on a base.

Referring to FIG. 8, in the exemplary embodiment of present invention, a disengagement prevention protrusion (223*a*) may be formed an inner lateral surface formed by the terminal reception groove (223) in order to prevent the terminal (120) inserted into the terminal reception groove (223) from vertically moving inside the terminal reception groove (223).

The disengagement prevention protrusion (223*a*) may prevent the terminal (120) from vertically moving inside the terminal reception groove (223) by pressing an upper surface of terminal (120) inserted into the terminal reception groove (223), for example. The disengagement prevention protrusion (223*a*) may help allow the terminal (120) to be smoothly inserted into the terminal reception groove (223), and, after the terminal (120) is inserted into the terminal reception groove (223), a lateral surface of disengagement prevention protrusion (223*a*) may be slantly formed relative to an inner lateral surface formed by the terminal reception groove (223) in order to prevent the terminal (120) from arbitrarily being disengaged, and a lower surface of disengagement prevention protrusion (223*a*) may be formed in parallel with the floor part (222).

Referring to FIG. 7 again, the lateral wall surfaces (224) of second molding part (220) may include a first lateral wall part (224*a*), a second lateral wall part (224*b*) and a third lateral wall part (224*c*).

The first to third lateral wall parts (224*a*,224*b*,224*c*) may be respectively extended from an edge of floor part (222) toward an upper surface, and a reception space may be formed inside of the second molding part (220) by the first to third lateral wall parts (224*a*,224*b*,224*c*) and the floor part (222).

Distal ends of first and second lateral wall parts (224*a*, 224*b*) contacting the third lateral wall part (224*c*) may be respectively formed with a first coupling part (225). Each of the first coupling parts (225) may take a protruding pillar shape, for example, and may be coupled to a fixing member (300, described later).

The third lateral wall part (224*c*) may be formed with an electric wire reception groove (226) in order to prevent interference with the electric wire (110) of wiring unit (100) illustrated in FIG. 3.

The size and depth of electric wire reception groove (226) may be formed to correspond to a diameter of electric wire (110), and the electric wire reception groove (226) may be differently formed depending on the diameter of electric wire (110).

A blocking wall (218) may be formed between the first and second molding parts (210, 220) in order to prevent the molding member (400) from being excessively leaked, and the blocking wall (218) may be formed with a groove to prevent the interference with the terminal (120) according to an exemplary embodiment of present invention.

Figure 9:
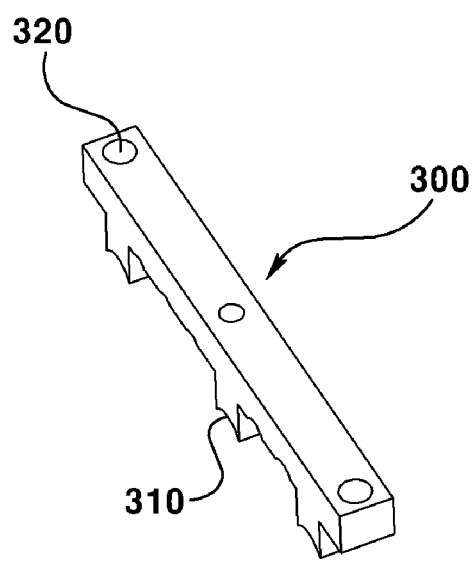
FIG. 9 is a perspective view illustrating a fixing member according to an exemplary embodiment of present invention.
Figure 10:
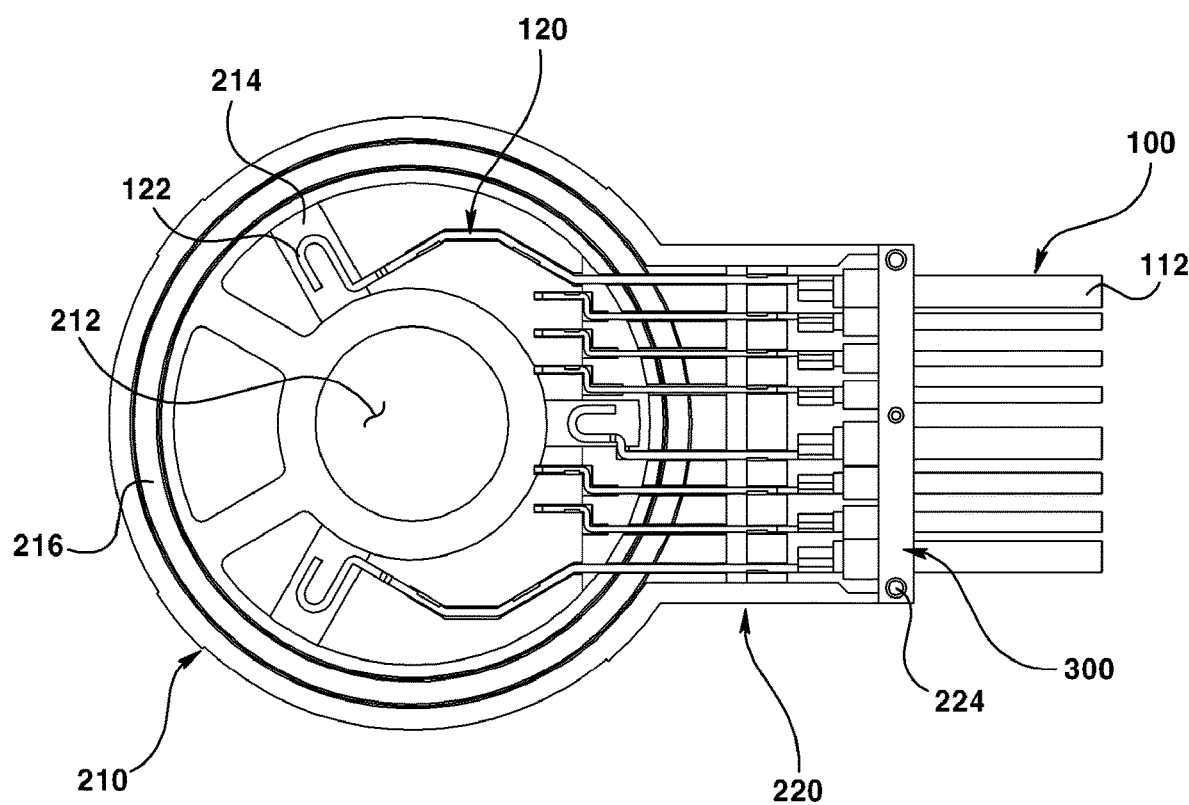
FIG. 10 is a plane view illustrating a wiring unit, an electric wire and a fixing member being coupled.

FIG. 9 is a perspective view illustrating a fixing member according to an exemplary embodiment of present invention, and FIG. 10 is a plane view illustrating a wiring unit, an electric wire and a fixing member being coupled.

Referring to FIGS. 9 and 10, the fixing member (300) may prevent the insulating sheath (112) from being disengaged from the third lateral wall part (224*c*) of second molding part (220) by pressing the insulating sheath (112) in the wiring unit (100) inserted into the second molding part (220), and may allow forming a reception space inside the second molding part (220). Although the exemplary embodiment of the present invention has illustrated and explained that the fixing member (300) presses the insulating sheath (112), the fixing member (300) may be coupled with the grommet (150) coupled to the insulating sheath (112).

The fixing member (300) may be formed with a rod shape corresponding to that of the third lateral wall part (224*c*).

For example, a lower surface facing the third lateral wall part (224*c*) on the rod-shaped fixing member (300) may be formed with a concave/convex (요철) part (310) that presses the insulating sheath (112) of electric wire (110). The length of the concave/convex (요철) part (310) formed at the fixing member (300) may be differently formed depending on a diameter of the electric wire (110).

The fixing member (300) may be formed with a second coupling part (320) formed on the second molding part (220) and coupled to the first coupling part (225) illustrated in FIG. 7.

The first coupling part (225) formed on the second molding part (220) according to an exemplary embodiment of present invention may be formed with a pillar shape, for example, and the second coupling part (320) formed on the fixing member (300) may be formed with a groove or a hole shape coupled by being inserted into the first coupling part (225).

Although the exemplary embodiment of present invention has illustrated and explained that the first coupling part (225) is formed with a pillar shape, and the second coupling part (320) is formed with a groove or a hole shape, alternatively, it may be possible that the first coupling part (225) is formed with a groove or a hole shape, and the second coupling part (320) is formed with a pillar shape.

Referring to FIG. 2 again, the molding member (400) may be filled in the reception space formed on the second molding part (220) to prevent moisture or humidity from being introduced into the first molding part (210) through the second molding part (220).

The molding member (400) may be formed by an LSR (Liquid Silicon Rubber) injection method, for example.

A material to form the molding member (400) may be used with a material having flexibility (or elasticity) and adhesive physical property when cured after being injected in a liquid state.

For example, a material useable for the molding member (400) may be one of rubber material, an epoxy material and silicon material that has flexibility and adhesive physical property when cured after being injected in a liquid state.

In the exemplary embodiment of present invention, when the molding member (400) is formed inside a reception space formed at the second molding part (220), the molding member (400) can prevent the degradation in sealing performances, despite a difference of expansion coefficient between the insulating sheath (112) and second molding part (220), a difference of expansion coefficient between the conductive wire (114) and the second molding part (220) and a difference of expansion coefficient between the terminal (120) and the second molding part (220), and even if the adhesive performance between the grommet (150) and insulating sheath (112), because the molding member (400) respectively encompasses a joined area between the insulating sheath (112) of electric wire (110), the conductive wire (114) of electric wire (110) and the conductive wire (114) and the terminal (120).

Particularly, the molding member (400), when having both flexibility and adhesive physical property, may prevent generation of gaps caused by deviation of expansion coefficient from various areas, whereby introduction of moisture or humidity into the first molding part (210) through the second molding part (220) can be fundamentally prevented.

Meantime, in the exemplary embodiment of present invention, a portion of molding member (400) is also provided with a trench-shaped groove (216) when the molding member (400) is formed on the second molding member (220) using an LSR injection method, and the molding member (400) provided with the trench-shaped groove (216) may function as a molding ring (or O-ring).

Thus, the number of parts for assembly and the number of assembly processes may be reduced, because a separate molding ring is dispensed with by providing a portion of molding member (400) to the trench-shaped groove (216) formed on the first molding part (210).

FIG. 11 is an exploded view of a motor having a motor connector according to an exemplary embodiment of present invention.

The motor connector of a motor illustrated in FIG. 11 may have a substantially same configuration as that of the motor connector illustrated in the previous FIGS. 1-10. Thus, like numbers refer to like elements throughout and explanations that duplicate one another will be omitted.

Referring to FIG. 11, the motor (900) may comprise a bearing (850), a motor connector (800) and a motor body (870).

The base (200) of motor connector (800) may be coupled by a bearing (850).

The motor body (870) may include a rotation shaft (872), a rotor rotating the rotation shaft (872) and a stator wrapping the rotor, and an upper end of motor body (870) may be formed with a coupling part (874) coupled to the base (200) of motor connector (800).

The coupling part (874) may function to prevent introduction of moisture or foreign object from outside when coupled with the base (200).

As explained in detail from the foregoing discussion, the present invention can improve hermeticity and airtightness and prevent an erroneous operation of motor, despite a difference of expansion coefficient between a terminal transmitting a power and sensing signal and a mold forming a body of connector, a difference of expansion coefficient between a cable sheath and a mold forming a body of a connector, and a difference of expansion coefficient between a core wire wrapped by the cable sheath and a mold forming a body of a connector, and a motor having the motor connector.

Furthermore, the present invention provides a motor connector configured to prevent an erroneous operation of motor by preventing introduction of humidity and moisture by preventing formation of a gap between a conductive wire of a cable and an insulation sheath, and a gap between an insulation sheath and a molding member.

Meantime, the exemplary embodiments disclosed in the drawings have been provided to assist in a comprehensive understanding of the embodiments of the invention. Accordingly, those of ordinary skill in the art will recognize that various changes and modifications of the embodiments described herein can be made without departing from the scope and spirit of the invention.

INDUSTRIAL APPLICABILITY

The present invention may be applicable to a connector applied to a motor used for a DCT (Dual Clutch Transmission) and to the DCT.

The invention claimed is:

1. A motor connector, comprising:
a wiring unit that includes an electric wire having an insulating sheath and a conductive wire, and a terminal coupled to the conductive wire at one end of the terminal and having an end part at the opposite end of the terminal;
a base including a first molding part, in which the terminal is arranged, and a second molding part extending from the first molding part and having a space for accommodating the conductive wire and a part of the insulating sheath;
a fixing member coupled to the second molding part, and fixing the insulating sheath;
a grommet having a cylindrical shape is arranged in the space between the fixing member and the second molding part, and the grommet having the cylindrical shape is coupled to an outer surface of the electric wire so as to press the electric wire, wherein
an internal diameter of the grommet is formed to be smaller than an outer diameter of the insulating sheath based on a center of the electric wire; and
a molding member filled in the space to mold the second molding part and to surround the grommet having the cylindrical shape, wherein the grommet having the cylindrical shape is a shrinkage member configured to be pressed by the molding member to have a shrinkage force.

2. The motor connector of claim 1, wherein the grommet is formed therein with a hole, and the grommet encompasses an outer surface of the insulating sheath.

3. The motor connector of claim 1, wherein an internal diameter of the grommet is formed to be smaller by 60%~70% than an outer diameter of the insulating sheath based on the center of the electric wire.

4. The motor connector of claim 1, wherein the molding member includes any one of a rubber, an epoxy and a silicon having flexibility and adhesive property.

5. The motor connector of claim 1, wherein the first molding part includes a trench-type groove formed along an upper edge of the first molding part based on a center of the first molding part, and the trench-type groove is configured to be filled with the molding member formed in the second molding part.

6. The motor connector of claim 1, wherein the grommet includes any one of silicon and rubber.

7. The motor connector of claim 1, wherein the electric wire includes a plurality of electric source wires applied with an electric source, and a plurality of sensing wires inputted and outputted by a sensing signal.

8. The motor connector of claim 1, wherein the second molding part includes a plurality of lateral wall parts forming the space by being upwardly extended from a floor part and from an edge of the floor part, wherein the floor part includes a staircase formed by being upwardly protruded from an upper surface of the floor part, and the floor part includes a terminal reception groove having a slit shape concavely formed at an upper surface of the staircase, and any one of the plurality of lateral wall parts is formed with an electric wire reception groove disposed with the electric wire.

9. The motor connector of claim 8, wherein the lateral wall part of the second molding part formed with the electric wire reception groove is formed with a first coupling part coupled with the fixing member, and the fixing member is formed with a second coupling part coupled with the first coupling part.

10. The motor connector of claim 1, wherein the fixing member is coupled to the grommet.

11. The motor connector of claim 1, wherein a blocking wall preventing leakage of molding member is formed between the first molding part and the second molding part.

12. A motor, comprising:
a motor connection including:
   a wiring unit, which includes an electric wire (cable) having an insulating sheath and a conductive wire, and a terminal coupled to the conductive wire at the one end of the terminal and having an end part at the opposite end of the terminal; a base including a first molding part, in which the terminal is arranged, and a second molding part extending from the first molding part and having a space for accommodating the conductive wire and a part of the insulating sheath; a fixing member coupled to the second molding part, and fixing the sheath; and a grommet having a cylindrical shape is arranged in the space between the fixing member and the second molding part, and the grommet having the cylindrical shape is coupled to an outer surface of the electric wire so as to press the electric wire;
a bearing disposed at a center of the base;
a motor body including an axis coupled with the bearing, wherein
an internal diameter of the grommet is formed to be smaller than an outer diameter of the insulating sheath based on a center of the electric wire; and
a molding member filled in the space to mold the second molding part and to surround the grommet having the cylindrical shape, wherein the grommet having the cylindrical shape is a shrinkage member configured to be pressed by the molding member to have a shrinkage force.

13. The motor of claim 12, wherein an internal diameter of the grommet is formed to be smaller by 60%~70% than an outer diameter of the insulating sheath based on a center of the electric wire.

* * * * *